March 3, 1964 T. A. PULLEYBLANK 3,122,775
COUNTERBALANCE SPRING RETAINER
Filed June 27, 1961
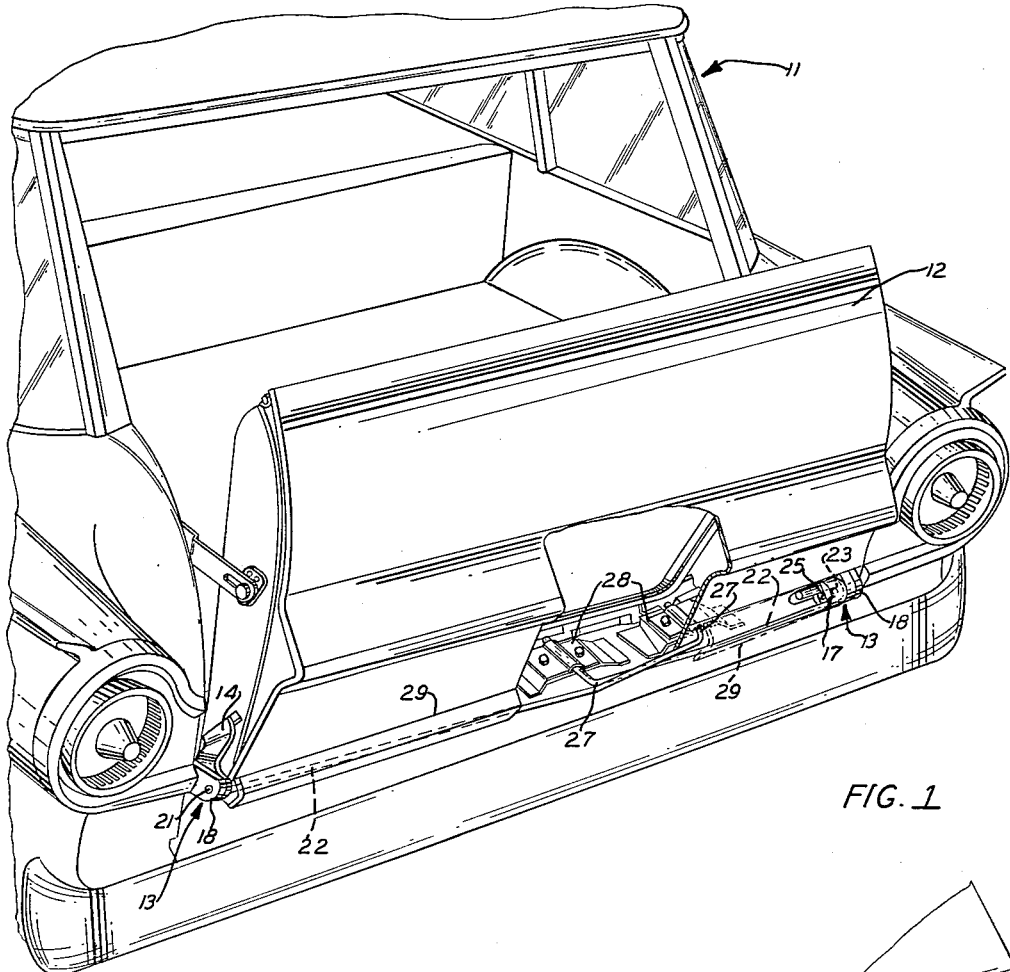
FIG. 1
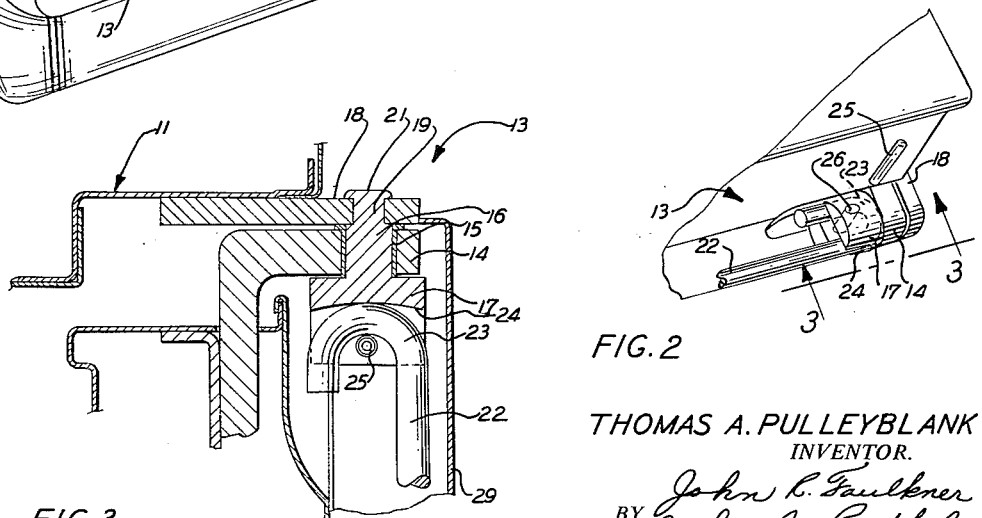
FIG. 2
FIG. 3
THOMAS A. PULLEYBLANK
INVENTOR.
BY John R. Faulkner
John J. Roethel
ATTORNEYS United States Patent Office 3,122,775
Patented Mar. 3, 1964

3,122,775
COUNTERBALANCE SPRING RETAINER
Thomas A. Pulleyblank, Livonia, Mich., assignor to Ford Motor Company, Dearborn, Mich., a corporation of Delaware
Filed June 27, 1961, Ser. No. 119,933
2 Claims. (Cl. 16—180)

This invention relates to a hinge and counterbalance structure for closure members of vehicular bodies and more particularly to a counterbalance spring retainer.

Vehicle closures swingable about horizontal hinge axes frequently require counterbalance means to assist operation in a direction of movement requiring lifting of the closure weight. Such counterbalance means are particularly required for station wagon tail gate structures. Such structures, which frequently house a movable window panel and its operating mechanism, latch mechanisms and latch mechanism operators, and hinge devices, are relatively heavy. Because of space and design limitations, tail gate counterbalance devices must be compact and easily concealed within the inner and outer panels of the tail gate structure. For these reasons torsion bars have found general acceptance for this application. The use of torsion bars, however, presents a problem in the provision of suitable means for transmitting torsion bar reaction forces to the vehicular body structure.

It is an object of the present invention to provide an improved construction and arrangement for transmitting torsion bar reaction forces through the hinge to the supporting vehicle body structure.

The closure member hinge portions of the instant invention are pivotally supported on a pair of spaced hinge pivot pins. The outboard ends of the pivot pins are nonrotatably received in complementary apertures formed in the body hinge portions. The inboard portion of the pivot pins is enlarged and formed with a slotted or socket portion which receives the U-shaped end of a counterbalance torsion bar. The other end of the torsion bar is secured to the closure member. Torsional stresses exerted on the torsion bar during pivotal movement of the closure member are received by the socket and transmitted to the body through the pivot pins.

Further objects and advantages of this invention will become more apparent as this description proceeds particularly when considered in conjunction with the accompanying drawings wherein:

FIG. 1 shows a portion of a motor vehicle incorporating the present invention with portions broken away to more clearly show the construction.

FIG. 2 is an enlarged view showing one of the hinges of the instant invention.

FIG. 3 is a cross sectional view taken along line 3—3 of FIG. 2.

Referring now in detail to the drawings and in particular to FIG. 1, there is shown generally at 11 a motor vehicle of the station wagon type. The rear cargo opening of station wagon 11 is provided with a closure member or tail gate 12. Tail gate 12 is shown partially opened in the drawings.

Tail gate 12 is pivotally supported for swinging movement between the opened and closed positions by a hinge structure generally shown at 13. A substantially similar hinge structure is utilized at each side of the tail gate 12. The details of hinge structure 13 may be best understood by reference to FIGS. 2 and 3 where the right hand hinge structure has been shown in enlarged views.

A bracket 14 is rigidly secured to each side of tail gate 12 and forms the closure member hinge portion to pivotally support tail gate 12 on a round portion 15 of the hinge pivot pin 16. An enlarged end 17 of pivot pin 16 prevents lateral movement of tail gate 12.

Outwardly extending arms 18 are welded or otherwise secured to station wagon body 11 at each side of tail gate 12 to form the body hinge portion. Pivot pin 16 is secured against rotation to each arm 18. This may be conveniently done by forming a square aperture in arm 18 through which a complementary shaped portion 19 of pivot pin 16 extends. Pivot pin 16 is then secured to arm 18 by upsetting its end as at 21.

A separate counterbalance torsion bar 22 is provided at each side of tail gate 12 to assist in the operation thereof. The outboard ends of torsion bars 22 are U-shaped as at 23 and are received in a slotted socket portion 24 formed in the enlarged ends 17 of pivot pins 16. A pin 25 passes through the apertures 26 formed in pivot pin 16 and is received in the bight of U-shaped portion 23 of torsion bar 22 retaining the torsion bar in socket portion 24. The inboard end of each torsion bar 22 is offset as at 27. Offset portion 27 is secured to the inner portion of tail gate 12 as by the retaining plate 28.

As the tail gate 12 swings into the open position, the inboard ends 27 of torsion bars 22 pivot with tail gate 12. Rotation of the U-shaped outboard end 23 of torsion bars 22 is prevented, however, by the sockets 24. This causes torsion bars 22 to deflect. The energy thus stored in torsion bars 22 is released to assist in the closing of tail gate 12. Torsion bars 22 may be enclosed in a decorative portion 29 of the body sheet metal.

The amount of preload placed on torsion bar 22 may be conveniently adjusted by varying the position of portion 19 of pivot pin 16 with respect to arm 18. This may also be done by varying the angular relationship between slot or socket 24 with respect to the axis of pin 16.

It will be further noted that socket portion 24 of hinge member 16 holds torsion bar 22 in a position which substantially coincides with the pivotal axis of tail gate 12. This permits a compact, easily concealed assembly. The U-shaped conformation of the ends 23 of torsion bars 22 and the complementary socket portion 24 of hinge member 16 further eliminates localized stress concentration in torsion bars 22 while effectively transmitting reaction loads to the rigid body structure.

It is to be understood that the invention is not to be limited to the exact construction shown and described, but that various changes and modifications may be made within the spirit and scope of the invention as defined by the appended claims.

I claim:

1. A hinge and counterbalance structure for a closure member comprising a support member, a pivot pin having a first end portion secured to said support member, a second end portion spaced from said support member and a bearing portion intermediate said end portions, means supporting said closure member upon the bearing portion of said pivot pin, said second end portion being enlarged relative to said bearing portion to restrain lateral movement of said closure member, socket means formed in said second end portion, torsion bar means having a U-shaped end portion received in said socket portion, a pin secured to said socket portion in the bight of said U-shaped end portion for restraining said torsion bar means from movement relative to said socket portion, and means securing a further portion of said torsion bar means to said closure member whereby said torsion bar means deflects upon pivotal movement of said closure member.

2. A hinge and counterbalance structure for a closure member comprising a support member, aligned pivot pins having first end portions secured to said support member at opposite sides of said closure member, each of said pivot pins having a bearing portion adjacent said first end portion and a second end portion spaced from said support member, means pivotally supporting said closure member upon the bearing portions of said pivot pins, said second end portions being enlarged relative to said bearing portions to restrain lateral movement of said closure member, socket means formed in said second end portions, a pair of torsion bar means having U-shaped end portions received in respective ones of said socket portions, and pins secured to said socket portions in the bight of said U-shaped end portions for restraining said torsion bar means for movement relative to said socket portions, and means securing a further portion of each of said torsion bar means to said closure member whereby said torsion bar means deflect upon pivotal movement of said closure member.

References Cited in the file of this patent

UNITED STATES PATENTS

| | | |
|---|---|---|
| 59,414 | Knight | Nov. 6, 1866 |
| 1,173,408 | Barnes | Feb. 29, 1916 |
| 1,611,238 | Sanborn | Dec. 21, 1926 |
| 2,580,760 | Goodwin | Jan. 1, 1952 |
| 3,022,536 | Floehr | Feb. 27, 1962 |

FOREIGN PATENTS

| | | |
|---|---|---|
| 90,112 | Austria | Nov. 25, 1922 |